Nov. 20, 1951 W. C. SCHEIDECKER 2,575,978
POTATO MASHER AND WHIPPER
Filed Nov. 28, 1947
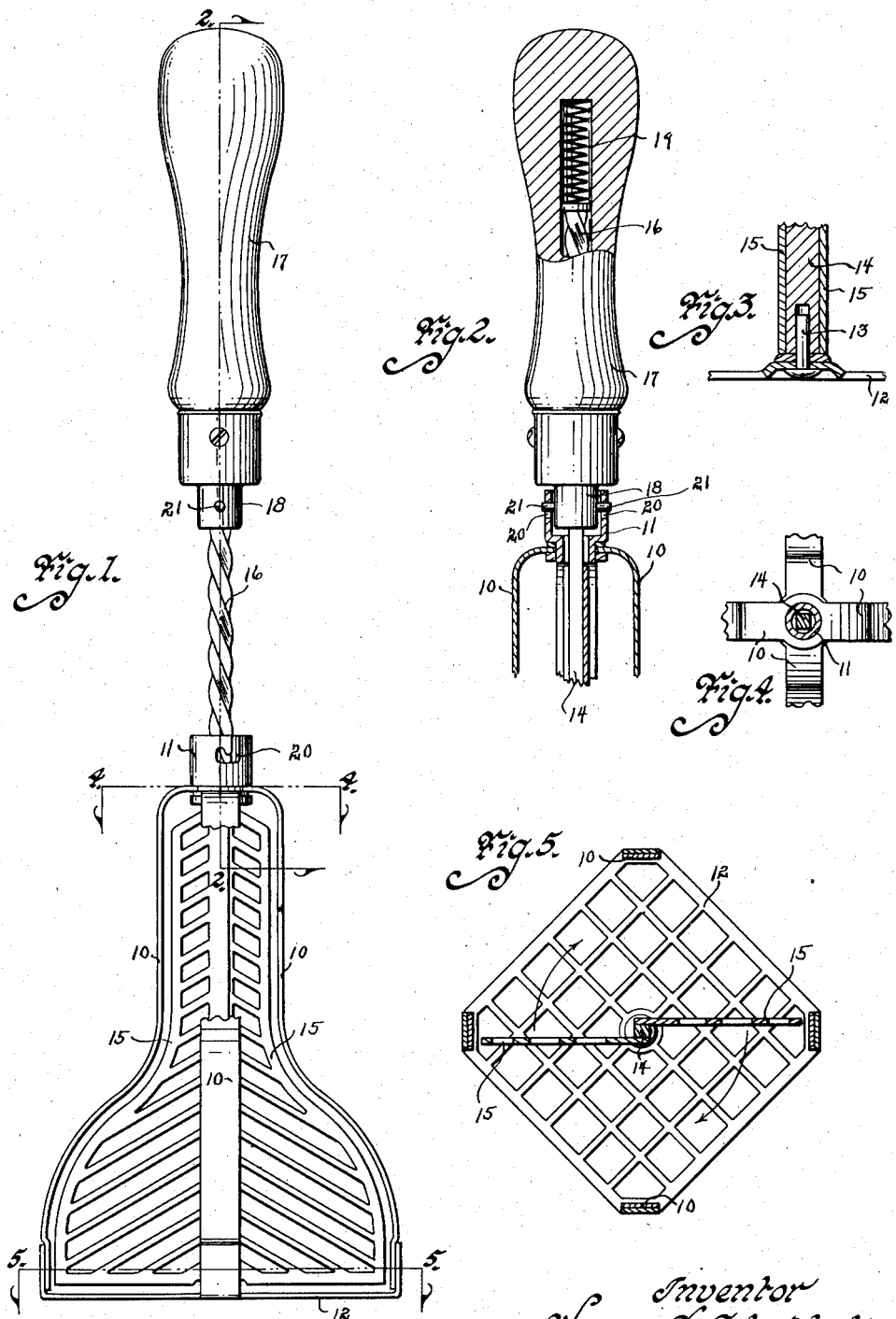
Inventor
Wayne C. Scheidecker
by M. Talbert Dick
Attorney
Witness
Edward P. Seeley Patented Nov. 20, 1951

2,575,978

UNITED STATES PATENT OFFICE 2,575,978

POTATO MASHER AND WHIPPER

Wayne C. Scheidecker, Lake View, Iowa

Application November 28, 1947, Serial No. 788,541

5 Claims. (Cl. 146—213)

The principal object of my invention is to provide a potato or like conditioner that not only is capable of mashing the potato or like but also simultaneously whipping the same.

A still further object of my invetion is to provide a potato or like masher and whipper that is sanitary and durable in use, and economical in manufacture.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of my device with a section broken away to more fully illustrate its construction.

Fig. 2 is a side sectional view of the upper portion of the tool taken on line 2—2 of Fig. 1.

Fig. 3 is an enlarged side sectional view of the bottom center portion of my device.

Fig. 4 is a top plan sectional view of the device taken on line 4—4 of Fig. 1.

Fig. 5 is a top plan sectional view taken on line 5—5 of Fig. 1.

In any kitchen be it home or large restaurant, there is great need for a manually operated portable culinary tool that may be easily and quickly used for mashing, whipping or for both mashing and whipping simultaneously. Mechanical power driven devices are excellent for whipping or stirring, but such beaters are not suited for mashing. Also they can not be readily moved about or successfully used in the usual cooking utensils. The ordinary potato masher can be moved about readily, but is not adapted to whipping or stirring. My device on the other hand has the handiness of a potato or like masher, and may be used as a whipper separately or in conjunction with the masher means, thereby saving much time and effort. My device may also be used for mixing various edibles.

Referring to the drawings, I have used the numeral 10 to designate the frame or cage of the device, which is in the form of four evenly spaced apart uprights joined together at their upper ends and secured by any suitable means to a bearing member 11. The numeral 12 designates a horizontal grid rigidly secured to the bottom portion of the uprights of the frame portion. This perforated grid is the potato or like masher portion of the device. The openings therein may be of any suitable design and the periphery of the member 12 may be also of any suitable design. In the drawings I show the openings rectangular and the periphery of square design, except at the corners, which are blunted to receive the uprights. The numeral 13 designates a vertical post pin in the center of the member 12 as shown in Fig. 3. The numeral 14 designates a shaft rotatably mounted around on the pin 13 and journaled in the bearing 11 as shown in Fig. 2. The numeral 15 designates two slitted or perforated wings extending substantially radially from the shaft 14, and having an outline substantially, but slightly smaller than that of the inside outline formed by the uprights of the frame and the surface of the masher portion 12. These perforated wings 15 form the whipping or mixing element of the device, and are designed to rotate directly above the portion 12, and inside the frame. The upper portion of the shaft 14 above the bearing member 11 is in the form of an auger or spiral designated by the numeral 16 and may be formed by the usual method of two twisted wires as shown in the drawing. The numeral 17 designates the handle portion loosely embracing the shaft portion 16. The numeral 18 designates the common and well known ratchet clutch on the lower end of the handle and embracing and functioning on the shaft portion 16. As is well known when the handle is manually moved downwardly, the member 17 will contact the spiral portion of the shaft and cause it to rotate. As the shaft portion 14 and 16 are common, the wings 15 will spin or rotate, thereby whipping, mixing or stirring material that comes in contact with them. If the portion 12 is placed on top of a potato or like, and the device forced downwardly by the handle, the potato or like will be mashed and forced upwardly through the openings in the member 12. As this mashed or like material passes above the plane of the member 12 it will be struck or whipped by the rotating wings 15. This action is accomplished with one downward movement of the handle. If the handle is raised to an elevated position shown in Fig. 1 it is again ready to be moved down and rotate the wings 15. This reciprocation of the handle functions the device. A spring 19 is placed above the shaft 16 and in the handle as shown in Fig. 2. Bayonet slots 20 are formed in the member 11. The numeral 21 designates two lugs on the member 18 capable of entering and engaging the bayonet slots. To use the device as a masher and not in combination with the whipper portion, it is merely necessary to force the handle downwardly and rotate the same for bringing the lugs into the bayonet slots as shown in Fig. 2. When the whipper portion is to be used, the handle is rotated to clear the lugs from the bayonet slots. The spring will not only cushion the action of the device but will hold the lugs in the bayonet slots when the device is used only as a masher. To use the device only as a whipper or beater the bottom of the device is held stationary and the handle reciprocated.

Some changes may be made in the construction and arrangement of my potato or like masher and whipper without departing from the real spirit and purpose of my invention, and it is my intention to cover by my claims, any modified forms of structure or use of mechanical equivalents which may be reasonably included within their scope.

I claim:

1. In a device of the class described, a frame portion, a perforated grid on the bottom of said frame, a shaft rotatably in said frame and having its upper end portion extending above said frame and of spiral construction, a wing having holes therein on said shaft and immediately above said grid, a handle member loosely embracing the upper end portion of said shaft and engaging the spiral thereof, a coil spring in said handle member and operatively bearing on the top of said shaft, a bayonet notch in said frame portion, and a lug on said handle portion capable of entering and engaging said bayonet slot.

2. In a device of the class described, a frame portion, a perforated grid on the bottom of said frame, a shaft rotatable in said frame and having its upper end portion extending above said frame and of spiral construction, a wing having holes therein on said shaft and immediately above said grid, a handle member loosely embracing the upper end portion of said shaft and engaging the spiral thereof, a coil spring in said handle member and operatively bearing on the top of said shaft, two bayonet notches in the upper portion of said frame portion, and two lugs on the lower end portion of said handle portion capable of entering and engaging said bayonet slots respectively for fastening said handle portion to said frame portion at times.

3. In a food masher and whipper, a frame having downwardly extending fingers, a masher grid secured solely to the lower ends of said fingers, a shaft journaled in said frame and having a portion extending above said frame; said portion of said shaft that is above said frame of spiral construction, a handle loosely embracing said spiral portion of said shaft and engaging said spiral, and a wing rigidly secured to said shaft and positioned immediately above said grid; said wing having a plurality of elongated slot openings therein.

4. In a device of the class described, a frame portion, a perforated grid on the bottom of said frame, a shaft rotatably mounted in said frame and having its upper portion of spiral construction and extending above said frame, a wing having holes therein on said shaft and immediately above said grid, a handle member loosely embracing the upper portion of said shaft and engaging the spiral thereof, a notch in said frame portion, and a lug on said handle capable of entering and engaging said notch for securing said handle to said frame at times.

5. In a device of the class described, a frame portion, a bearing member at the top of said frame portion, a bottom plate member having holes therein secured to the lower portion of said frame, a shaft journaled in said bearing member and having its upper portion of spiral construction and extending above said frame, wing members on the lower portion of said shaft and directly above said plate; said wing members each having holes therein, and a handle member slidably rotatably mounted on the upper portion of said shaft and in engagement with the spiral construction of said shaft.

WAYNE C. SCHEIDECKER.

REFERENCES CITED

The following references are of record in the file of this patent:

UNITED STATES PATENTS

| Number | Name | Date |
|---|---|---|
| 529,401 | McCoy et al. | Nov. 20, 1894 |
| 793,106 | Spaeth | June 27, 1905 |
| 817,635 | Flowers | Apr. 10, 1906 |
| 887,790 | Griswold | May 19, 1908 |
| 1,023,317 | Jackson | Apr. 16, 1912 |
| 1,219,580 | Pancoast | Mar. 20, 1917 |
| 1,224,134 | Burford | May 1, 1917 |
| 1,415,251 | McLean | May 9, 1922 |
| 1,592,149 | Murden | July 13, 1926 |

FOREIGN PATENTS

| Number | Country | Date |
|---|---|---|
| 56,314 | Switzerland | Apr. 26, 1912 |